United States Patent [19]
De Vito

[11] Patent Number: 4,865,473
[45] Date of Patent: Sep. 12, 1989

[54] SINGLE SPLIT CAGE LOCKING TAB

[75] Inventor: Edward F. De Vito, Torrington, Conn.

[73] Assignee: The Torrington Company, Torrington, Conn.

[21] Appl. No.: 240,288

[22] Filed: Sep. 6, 1988

[51] Int. Cl.[4] .................... F16C 33/46; F16C 33/56
[52] U.S. Cl. .................................. 384/572; 384/576; 384/577
[58] Field of Search ................ 384/523, 526–534, 384/539, 572, 573, 576–580

[56] References Cited

U.S. PATENT DOCUMENTS

| | | | |
|---|---|---|---|
| 2,706,137 | 5/1955 | Stricklen | 384/529 |
| 3,399,008 | 8/1968 | Farrell et al. | 384/577 |
| 4,239,304 | 12/1980 | Wakunami | 384/573 |
| 4,397,507 | 8/1983 | Kraus et al. | 384/576 |
| 4,472,007 | 9/1984 | De Vito | 384/572 |

FOREIGN PATENT DOCUMENTS 227036 9/1962 Austria .................. 384/530

Primary Examiner—Thomas R. Hannon
Attorney, Agent, or Firm—Wayne O. Traynham

[57] ABSTRACT

An annular ring for use with a bearing cage, retainer, or separator has a single split which allows the ring to be pulled open to a C-shaped configuration in order to facilitate installation of the ring around an inner race or a shaft. The two adjacent ends of the split ring have male and female locking elements which mate so as to lock the ring together and thereby limit radial, axial, and circumferential motion of the two ends. The pockets and locking elements are configured so as to allow the ring to be manufactured by an axial-draw molding method.

1 Claim, 1 Drawing Sheet

SINGLE SPLIT CAGE LOCKING TAB

This invention relates to bearings which employ cages to assist in limiting motion of the roller elements; more particularly, it relates to means for connecting the two ends of a split one-piece cage made from a flexible resilient material such as plastic. Retainers and separators employing similar configurations also come within the scope of this invention; therefore, it is to be understood that the term "cage" includes a retainer or a separator whenever the term is used in this application. This invention is particularly well-suited for use in automotive applications.

Prior art patents disclose locking devices for plastic single split annular bearing cages having abutting faces with mutually corresponding protections and depressions which formlock the ends using a hook-type projection on one end that snaps into a corresponding recess. An example of this type of prior art is included in U.S. Pat. No. 4,397,507 for a "Novel Plastic Cage For Rolling Bearings" issued in the names of Gerhard Kraus and Gunther Schwarz on Aug. 9, 1983.

Other prior art discloses split cage assemblies having abutting faces with male and female members of matching sizes at opposing ends. The faces of the members have projections which fit into corresponding recesses on the opposing member, but the projections are oriented circumferentially on the female member rather than radially on the male member. An example of this type of prior art is found in U.S. Pat. No. 2,706,137 for a "Ball Bearing Assembly" issued in the name of Clifford C. Stricklen on Apr. 12, 1955

The main problem with the prior art is that most resilient flexible cages disclosed must be made by a radial-draw molding technique. This is a relatively expensive technique compared to an axial-draw molding technique. The present invention solves this problem by providing a cage structure design which can be manufactured using the axial-draw method.

Briefly described, the cage of the present invention comprises an annular ring having multiple pockets which are spaced apart from each other circumferentially. Multiple roller elements are contained by the pockets. The ring has one axial split which allows the cage to be opened to a C-shaped configuration in order to facilitate installation. The split allows the ring to be closed in on itself, by bringing one end under the other end and compressing the ring, in order to decrease the diameter of the ring for installation in an outer race component. The two ends of the ring at the split are designed to make a locking fit which limits axial, radial, and circumferential motion of the ends. Each of the two ends has male locking elements and corresponding female locking elements. The pockets and locking elements have configurations which allow the use of axial-draw molding techniques.

This invention may be better understood by reference to the following detailed description and drawings in which.

Figure 1:
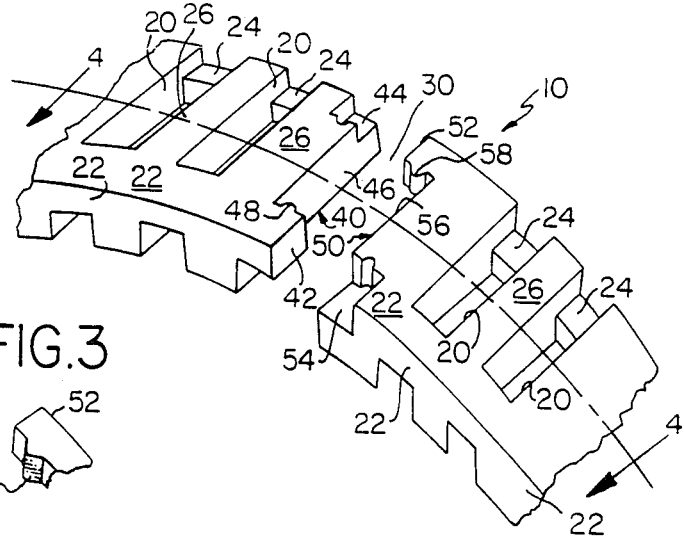
FIG. 1 is a fragmentary perspective view of the preferred embodiment of the cage of the present invention.
Figure 2:
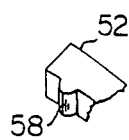
FIG. 2 is a fragmentary perspective view, looking radially inwardly at the outside surface of the cage, of a male locking element of the cage shown in FIG. 1.
Figure 3:
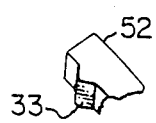
FIG. 3 is a fragmentary perspective view, similar to FIG. 2, of another male locking element having a protuberance with an alternate shape from that shown in FIG. 2.

Referring to the drawings, and more particularly to FIGS. 1 and 2, the preferred embodiment of the cage of the present invention comprises an annular ring 10 having multiple roller elements 13 (see FIG. 4), multiple pockets 20, a split 30, and two ends 40 and 50. Each pocket 20 comprises an outer annular end rim 22 and an inner annular end rim 24. Each of rims 22 and 24 has an inner surface and an outer surface. As shown in FIG. 1, the outer surface of end rim has a smaller diameter than the inner surface of end rim 22. End rims 22 and 24 are connected by cross-bars 26. Split 30 allows ring 10 to be pulled open into a C-shaped configuration in order to facilitate installation of the ring around an inner race or a shaft (not shown). End 40 has a male locking element 42, a female locking element 44, and a flat end surface 46. End 50 also has a male locking element 52 which is designed to mate with element 44, a female locking element 54 designed to receive element 42, and a flat end surface 56 which matches surface 46 so as to make a flush fit with surface 46 when ends 40 and 50 are locked together. When the ends are thus locked, element 42 makes a snug fit with female element 54 and element 44 likewise makes a tight fit with male element 52. As can be seen in FIGS. 1 and 2, male elements 42 and 52 have protuberances 48 and 58, respectively, which both have semicircular shapes. FIG. 3 illustrates one possible modification of this shape with a modified protuberance 33; other modified shapes could also suffice as long as the protuberances 48 and 58 retain their functional ability to lock ends 40 and 50 together.

Figure 4:
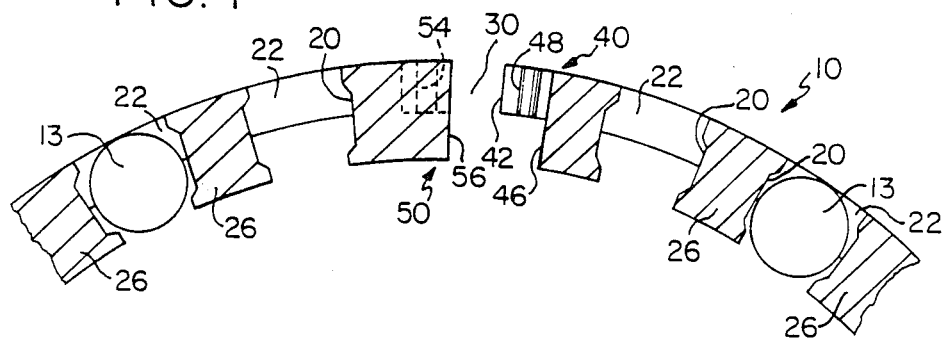
FIG. 4 is a fragmentary sectional view of the same cage, taken along line 4—4 in FIG. 1.

Turning now to FIG. 4, the cross-section of each pocket 20 is configured to limit inward and outward radial motion of roller elements 13, e.g., needle rollers. Two representative rollers 13 are shown in two of the pockets in FIG. 4. As discussed above, pockets 20 could have different sectional profiles which limit only inward radial motion or only outward radial motion; in this case, the ring 10 could be used as a retainer. Alternatively, each pocket 20 could have a configuration which did not limit either inward or outward radial motion, but instead provided only circumferential spacing between the roller elements; in that case, the ring 10 would serve as a separator. The use of the term "cage" in this application includes configurations of ring 10 which could also be used as a retainer or a separator.

Figure 5:
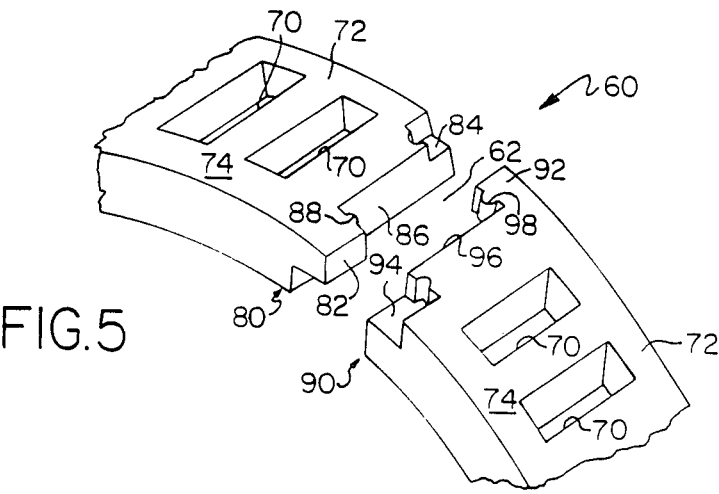
FIG. 5 is a fragmentary perspective view of a cage having a modified embodiment of the present invention.

Finally, FIG. 5 depicts a modified embodiment of the cage of the present invention which employs locking elements similar to those shown in FIG. 1, but has different configurations for the pockets. Ring 60 has a split 62, pockets 70, and two ends 80 and 90. End 80 has a male locking element 82, a female locking element 84, and a flat end surface 86. End 90 also has a male locking element 92 which is designed to mate with element 84, a female locking element 94 designed to receive element 82, and a flat end surface 96 which matches surface 86 so as to make a flush fit with surface 86 when ends 80 and 90 are locked together. When the ends are thus locked, element 82 makes a snug fit with female element 94, and element 84 likewise makes a tight fit with male element 92. Male elements 82 and 92 can have different shapes, e.g., as shown for elements 42 and 52 in FIGS. 2 and 3, as long as they can function to interlock with female locking elements 94 and 84, respectively. The pockets 70 are defined by two end rims 72 and 74 which can be formed only by a radial-draw molding technique and not by an axial-draw method. With the exception of end rims 72 and 74, rings 10 and 60 are alike in every other respect.

Certain modifications of the preferred embodiment described above, in addition to those shown in FIGS. 3 and 5, may be made without departing from the scope of the invention. Possible modifications include the employment of multiple rows of roller elements, rather than a single row as shown in the preferred embodiment. In addition, multiple sets of locking elements may be utilized either circumferentially or axially, instead of just one set as shown in FIGS. 1 and 5. Multiple circumferential sets of locking elements could be employed where the ring has more than one split. Multiple axial sets of locking elements could be employed where the ring has more than one row of roller elements.

I claim:

1. For use in an antifriction bearing having a plurality of roller elements, an annular ring for retaining said roller elements, said ring made of a resilient flexible material by axial-draw molding techniques, said ring comprising:

a first noncontinuous annular end rim having an inner surface and an outer surface;

a second noncontinuous annular end rim having an inner surface and an outer surface, said inner surface of said first end rim having a diameter slightly larger than that of said outer surface of said second end rim;

multiple cross-bars connecting said end rims;

multiple pockets defined by said rims and cross-bars, said pockets being configured so as to receive and limit the motion of said roller elements;

a first end of said rims, said first end having a first male locking element and a first female locking element;

a second end of said rims, said second end having a second male locking element and a second female locking element, said second male locking element being configured and positioned so as to interlock with said first female locking element, and said second female locking element being configured and positioned so as to interlock with said first male locking element; and an axially aligned separation defined by said first and second ends.

* * * * *